United States Patent
Matsukawa

(10) Patent No.: US 10,725,880 B2
(45) Date of Patent: Jul. 28, 2020

(54) SEMICONDUCTOR DEVICE

(71) Applicant: Renesas Electronics Corporation, Tokyo (JP)

(72) Inventor: Shohei Matsukawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 54 days.

(21) Appl. No.: 16/059,903

(22) Filed: Aug. 9, 2018

(65) Prior Publication Data

US 2019/0102271 A1 Apr. 4, 2019

(30) Foreign Application Priority Data

Sep. 29, 2017 (JP) .................................. 2017-189496

(51) Int. Cl.
| | |
|---|---|
| *G11C 29/00* | (2006.01) |
| *G06F 11/22* | (2006.01) |
| *G06F 11/10* | (2006.01) |
| *G06F 11/30* | (2006.01) |
| *G06F 11/16* | (2006.01) |
| *G06F 11/27* | (2006.01) |

(52) U.S. Cl.
CPC ...... *G06F 11/2236* (2013.01); *G06F 11/1016* (2013.01); *G06F 11/1048* (2013.01); *G06F 11/1608* (2013.01); *G06F 11/1641* (2013.01); *G06F 11/27* (2013.01); *G06F 11/3037* (2013.01); *G06F 11/1654* (2013.01); *G06F 11/2215* (2013.01)

(58) Field of Classification Search
CPC ............ G06F 11/2236; G06F 11/1016; G06F 11/3037
See application file for complete search history.

(56) References Cited

U.S. PATENT DOCUMENTS

| | | |
|---|---|---|
| 5,231,640 A | 7/1993 | Hanson et al. |
| 5,428,768 A | 6/1995 | Sugahara |
| 2003/0135790 A1* | 7/2003 | Pignol ................. G06F 11/1641 714/38.13 |

(Continued)

OTHER PUBLICATIONS

Extended European Search Report dated Jun. 25, 2019 for European Patent Application No. 18188636.7-1224.

(Continued)

*Primary Examiner* — Samir W Rizk
(74) *Attorney, Agent, or Firm* — McDermott Will & Emery LLP

(57) ABSTRACT

There is a need to detect faults on a path between a memory access circuit and a shared resource, faults in a logic circuit, and faults in the shared resource. A semiconductor device includes: a first memory access circuit; a second memory access circuit to check the first memory access circuit; a memory that outputs a memory address based on a first access address input from the first memory access circuit; a duplexing comparison circuit that compares the first access address with a second access address output from the second memory access circuit; a first address comparison circuit that compares the first access address with the memory address; and an error control circuit that outputs a control signal based on a comparison result from the duplexing comparison circuit and a comparison result from the first address comparison circuit.

11 Claims, 10 Drawing Sheets

(56) References Cited

U.S. PATENT DOCUMENTS

2013/0038945 A1 2/2013 Takemoto et al.
2018/0174665 A1* 6/2018 Kraipak ................ G11C 29/38

OTHER PUBLICATIONS

Halbert M. P. Ed—Pulka Andrzej, et. al.: "Selfchecking computer module based on the Viper microprocessor", Microprocessors and Microsystems, IPC Business Press Ltd. London, GB, vol. 12, No. 5, Jun. 1, 1988 (Jun. 1, 1988), pp. 264-270, XP000003930, ISSN: 0141-9331, DOI: 10.1016/0141-9331(88)90127-5.

* cited by examiner

SEMICONDUCTOR DEVICE

CROSS-REFERENCE TO RELATED APPLICATIONS

The disclosure of Japanese Patent Application No. 2017-189496 filed on Sep. 29, 2017 including the specification, drawings and abstract is incorporated herein by reference in its entirety.

BACKGROUND

The present disclosure relates to a semiconductor device and is applicable to a semiconductor device having a failure detection function, for example.

An in-vehicle microcontroller includes a safety mechanism to monitor operation of a CPU of the microcontroller in addition to safety mechanisms such as an ECC (Error Correction Code) circuit provided for SRAM or flash memory and a BIST (Built in Self Test) circuit to perform self-diagnosis.

The dual lockstep (hereinafter referred to as a lockstep) is a most popular system as the safety mechanism to monitor CPU operations. The system synchronizes clocks of two CPUs mounted on one semiconductor chip and concurrently allows each CPU to perform the same process. The system allows a comparison circuit to compare processing results from the CPUs with each other and performs the process only when the processing results are identical. The lockstep is disclosed in U.S. Patent Application Publication No. 2013/038945, for example.

Patent Literature 1: U.S. Patent Application Publication No. 2013/038945

SUMMARY

A bus master such as the CPU, when using a lockstep configuration, can detect faults on the bus master. However, the lockstep configuration cannot detect faults outside the lockstep. That is, it is impossible to detect faults on a path between the bus master based on the lockstep configuration and a shared resource, faults in a logic circuit, and faults in the shared resource when the bus master accesses the shared resource such as the memory. These and other objects and novel features may be readily ascertained by referring to the following description of the present specification and appended drawings.

The description below concisely explains an overview of representative aspects according to the present disclosure. That is, the semiconductor device includes a comparison circuit for access signals to the shared resource.

The above-mentioned semiconductor device can detect a fault on an access path to the shared resource.

DETAILED DESCRIPTION

Figure 1:
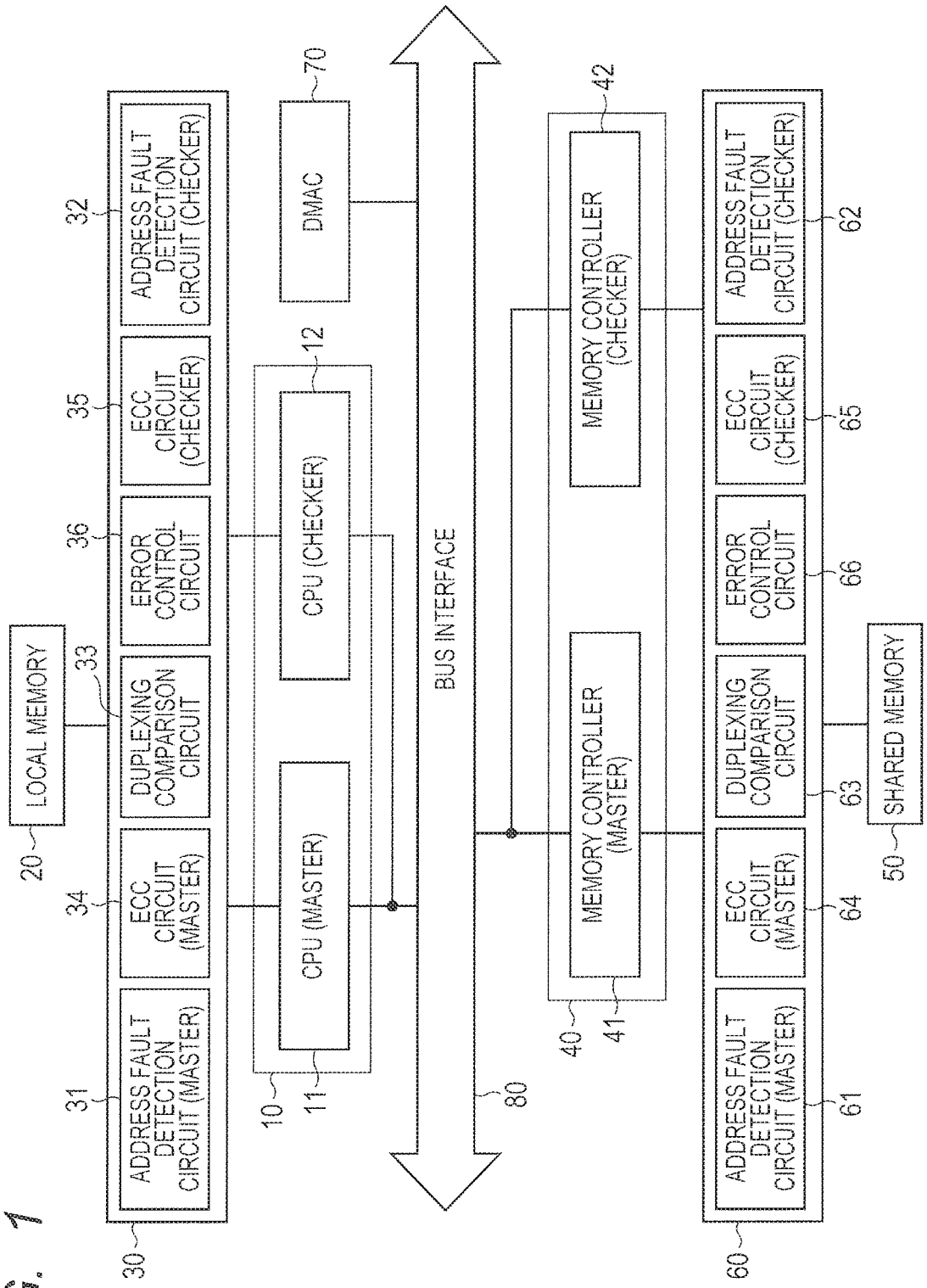
FIG. 1 is a diagram illustrating a configuration example of a microcontroller.

As above, the bus master such as the CPU using the lockstep configuration can detect faults on the bus master. However, the lockstep configuration cannot detect faults outside the lockstep. That is, it is impossible to detect faults on a path between the bus master based on the lockstep configuration and a shared resource, faults in a logic circuit, and faults in the shared resource when the bus master accesses the shared resource such as the memory.

Concerning the memory, the BIST circuit can detect faults in the memory. However, the technique of the BIST circuit reads a test pattern into the memory using a path inoperable simultaneously with user operations and compares an expected pattern value with a read result. The circuit configuration therefore disables uninterrupted runtime monitoring. Operating the BIST circuit during the runtime allows the BIST circuit to rewrite the data in the memory. The bus master therefore needs to save the memory data in another memory before operating the BIST circuit.

During the runtime, it may be impossible to detect a fault in the shared resource such as the memory subsequent to a lockstep-based duplexing comparison circuit.

To solve this, the semiconductor device according to an embodiment includes a comparison circuit that compares a signal accessing the shared resource with an access signal output from the shared resource. It is thereby possible to detect an access signal fault. There is also provided a circuit to hold a faulty access signal. This can isolate a cause of the fault. Supplying the faulty access signal to a comparator can detect a fault of the comparator.

The description below explains a working example and modifications with reference to the accompanying drawings. In the description below, the same constituent elements are designated by the same reference numerals and a repetitive explanation may be omitted for simplicity.

Working Example

Figure 2:
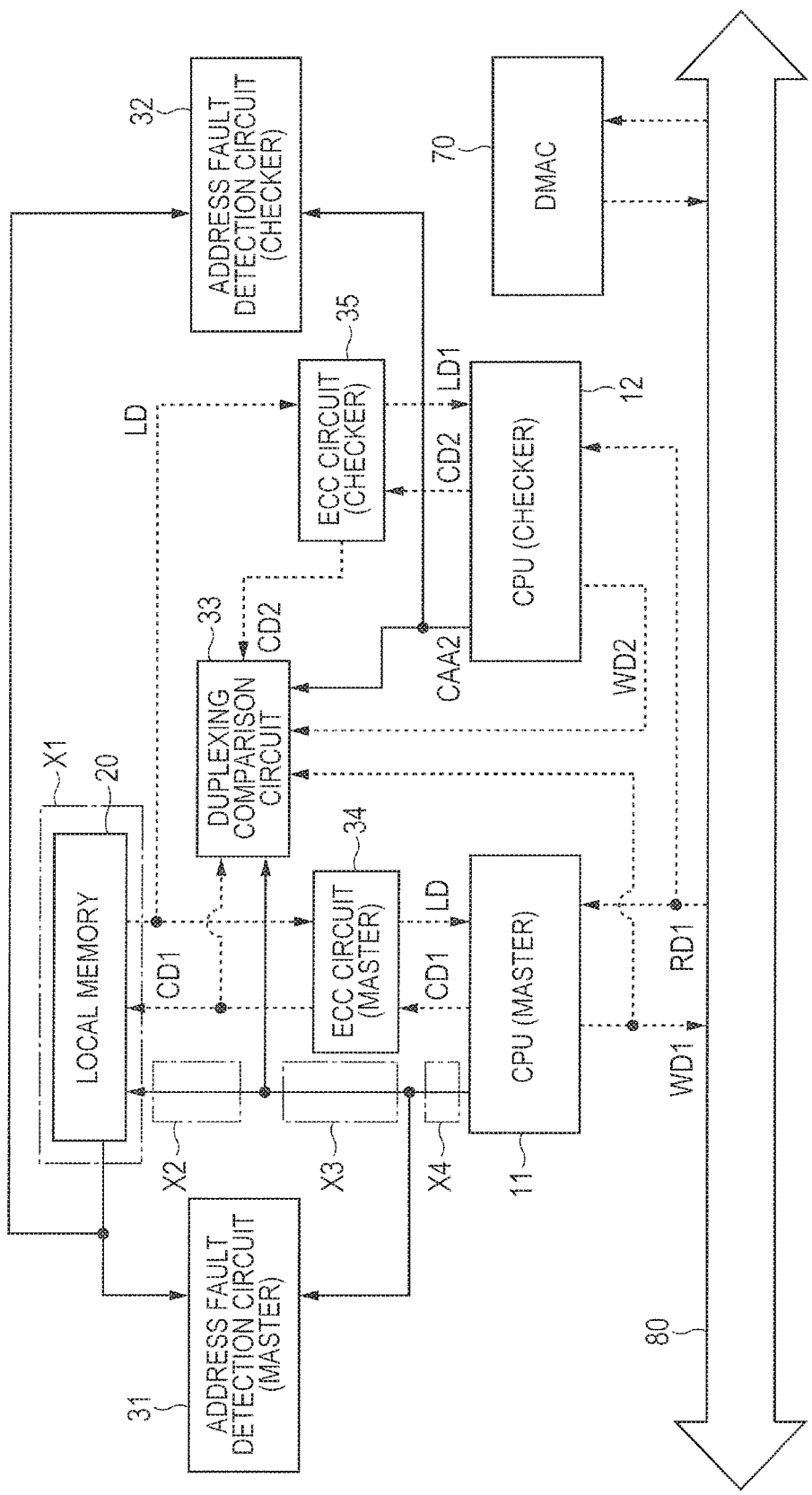
FIG. 2 is a diagram illustrating a flow of addresses and data at the CPU side in FIG. 1.
Figure 3:
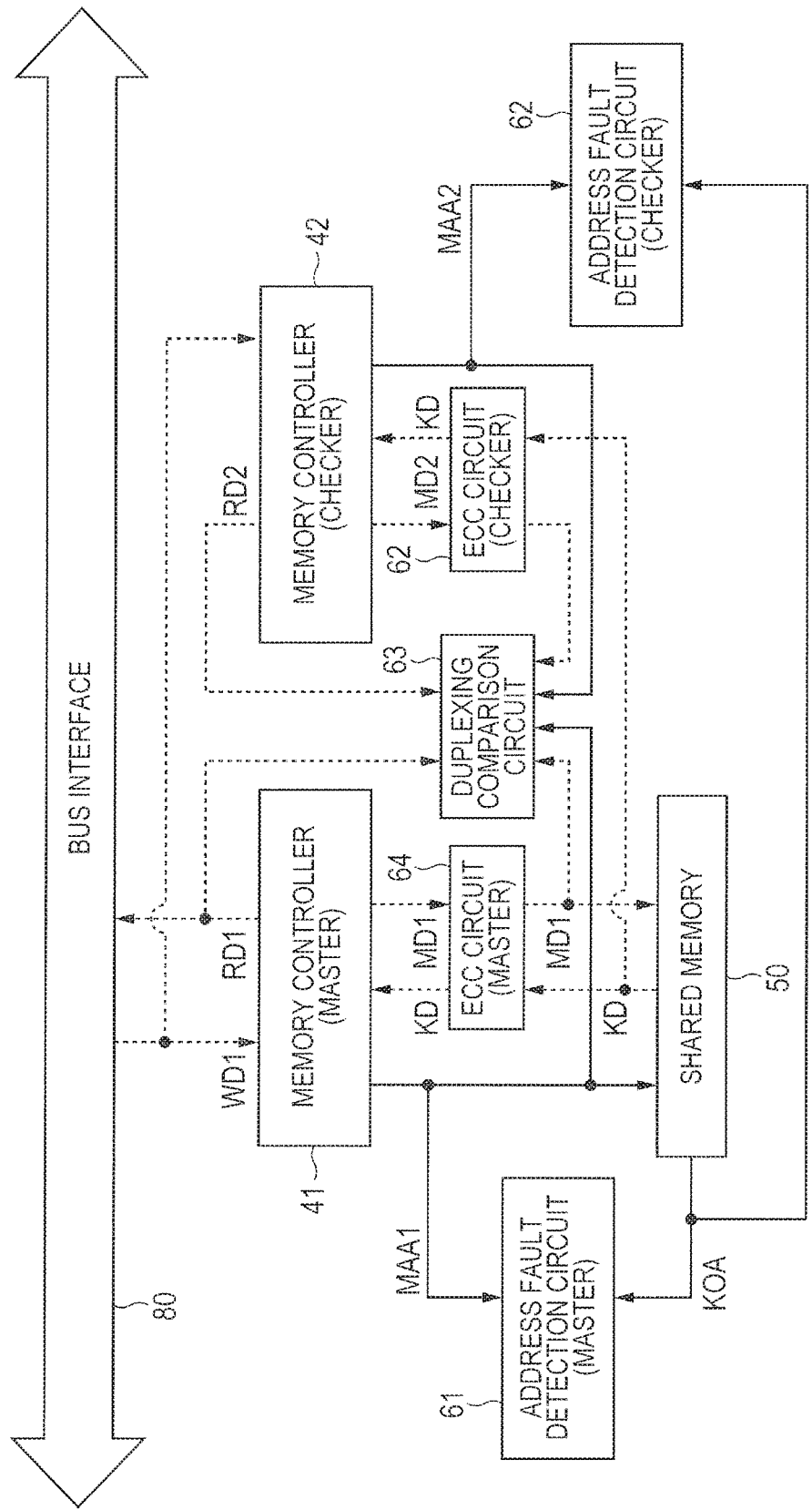
FIG. 3 is a diagram illustrating a flow of addresses and data at the memory controller side in FIG. 1.

FIGS. 1 through 3 are used to outline a configuration and operation of a microcontroller. FIG. 1 is a block diagram illustrating a configuration example of the microcontroller. FIG. 2 is a block diagram illustrating a flow of addresses and data at the CPU side in FIG. 1. FIG. 3 is a block diagram illustrating a flow of addresses and data at the memory controller side in FIG. 1.

A microcontroller 1 is a semiconductor device that includes, in a single semiconductor chip, a CPU 10 including a master-side CPU 11 and a checker-side CPU 12, local memory 20, a fault detection circuit 30, a memory controller 40 including a master-side memory controller 41 and a checker-side memory controller 42, shared memory 50, a fault detection circuit 60, a DMA controller (DMAC) 70, and a bus 80. The local memory 20 and the shared memory 50 are configured as SRAM, for example. The CPU 10 can access the local memory 20 and can access also the shared memory 50 via the memory controller 40. The DMAC 70 can access also the shared memory 50 via the memory controller 40.

The fault detection circuit 30 at the CPU side includes a master-side address fault detection circuit 31, a checker-side address fault detection circuit 32, a duplexing comparison circuit 33, a master-side ECC circuit 34, and a checker-side ECC circuit 35.

The fault detection circuit 60 at the memory controller side includes a master-side address fault detection circuit 61, a checker-side address fault detection circuit 62, a duplexing comparison circuit 63, a master-side ECC circuit 64, and a checker-side ECC circuit 65.

The CPU 11 as a memory access circuit may read data from the local memory 20. In this case, as illustrated in FIG. 2, the CPU 11 outputs an address signal (CAA1) for memory access to the local memory 20, the address fault detection circuit 31, and the duplexing comparison circuit 33, and reads a data signal (LD) from the local memory 20 via the ECC circuit 34. The CPU 12 outputs an address signal (CAA2) for memory access to the address fault detection circuit 32 and the duplexing comparison circuit 33 and reads a data signal (LD) via the ECC circuit 35. The local memory 20 outputs the input address signal (CAA1) as a memory output address signal (LOA) to the address fault detection circuits 31 and 32.

The CPU 10 may write data to the local memory 20. In this case, as illustrated in FIG. 2, The CPU 11 outputs an address signal (CAA1) for memory access to the local memory 20, the address fault detection circuit 31, and the duplexing comparison circuit 33, and outputs a data signal (CD1) to the local memory 20 and the duplexing comparison circuit 33 via the ECC circuit 34. The CPU 12 outputs the address signal (CAA2) for memory access to the address fault detection circuit 32 and the duplexing comparison circuit 33, and outputs a data signal (CD2) to the duplexing comparison circuit 33 via the ECC circuit 35. The local memory 20 outputs the input address signal (CAA1) as the memory output address signal (LOA) to the address fault detection circuits 31 and 32.

The CPU 10 may write data to the bus 80. In this case, as illustrated in FIG. 2, the CPU 11 outputs a data signal (WD1) to the duplexing comparison circuit 33. The CPU 12 outputs a data signal (WD2) to the duplexing comparison circuit 33. The CPU 11 may read a data signal (RD1) from the bus 80. In this case, as illustrated in FIG. 2, the CPU 12 also reads the data signal (RD1).

The memory controller 40 as a memory access circuit may read data from the shared memory 50. In this case, as illustrated in FIG. 3, the memory controller 41 outputs an address signal (MAA1) for memory access to the shared memory 50, the address fault detection circuit 61, and the duplexing comparison circuit 63, and reads a data signal (KD) from the shared memory 50 via the ECC circuit 64. The memory controller 42 outputs an address signal (MAA2) for memory access to the address fault detection circuit 62 and the duplexing comparison circuit 63, and reads a data signal (KD) from the shared memory 50 via the ECC circuit 65. The shared memory 50 outputs the input address signal (MAA1) as an address signal (KOA) to the address fault detection circuits 61 and 62.

The memory controller 40 may write data to the shared memory 50. In this case, as illustrated in FIG. 3, the memory controller 41 outputs an address signal (MAA1) for memory access to the shared memory 50, the address fault detection circuit 61, and the duplexing comparison circuit 63, and outputs a data signal (MD1) to the shared memory 50 and the duplexing comparison circuit 63 via the ECC circuit 64. The memory controller 42 outputs an address signal (MAA2) for memory access to the address fault detection circuit 62 and the duplexing comparison circuit 63, and outputs a data signal (MD2) to the via the ECC circuit 65. The shared memory 50 outputs the input address signal (MAA1) as an address signal (KOA) to the address fault detection circuits 61 and 62.

The memory controller 40 may read data to the bus 80. In this case, as illustrated in FIG. 3, the memory controller 41 outputs a data signal (RD1) to the duplexing comparison circuit 63. The memory controller 42 outputs a data signal (RD2) to the duplexing comparison circuit 63. The CPU 11 may write a data signal (WD1) to the memory controller 41. In this case, as illustrated in FIG. 3, the data signal (WD1) is also written to the memory controller 42.

The address fault detection circuit 31 and the ECC circuit 34 detect a fault of the local memory 20 in region X1. The address fault detection circuit 31 detects a fault of an address line or a buffer circuit in region X2 where the address signal (CAA1) is transmitted. The address fault detection circuit 31 and the duplexing comparison circuit 33 detect a fault of an address line or a buffer circuit in region X3 where the address signal (CAA1) is transmitted. The duplexing comparison circuit 33 detects a fault of an address line or a buffer circuit in region X4 where the address signal (CAA1) is transmitted.

Figure 4:
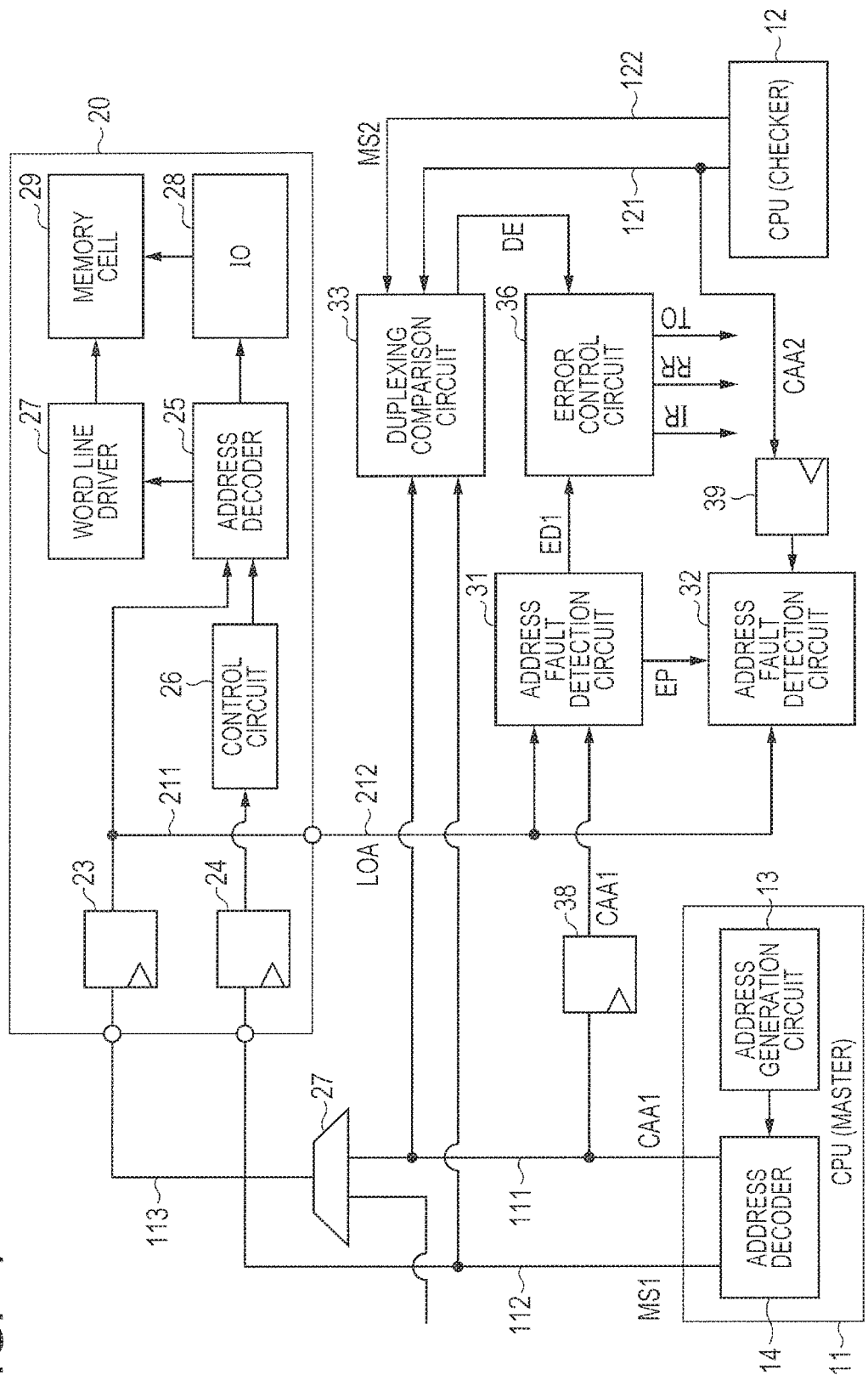
FIG. 4 is a block diagram illustrating a more detailed configuration of the CPU, the fault detection circuit, and the local memory in FIG. 2.
Figure 5:
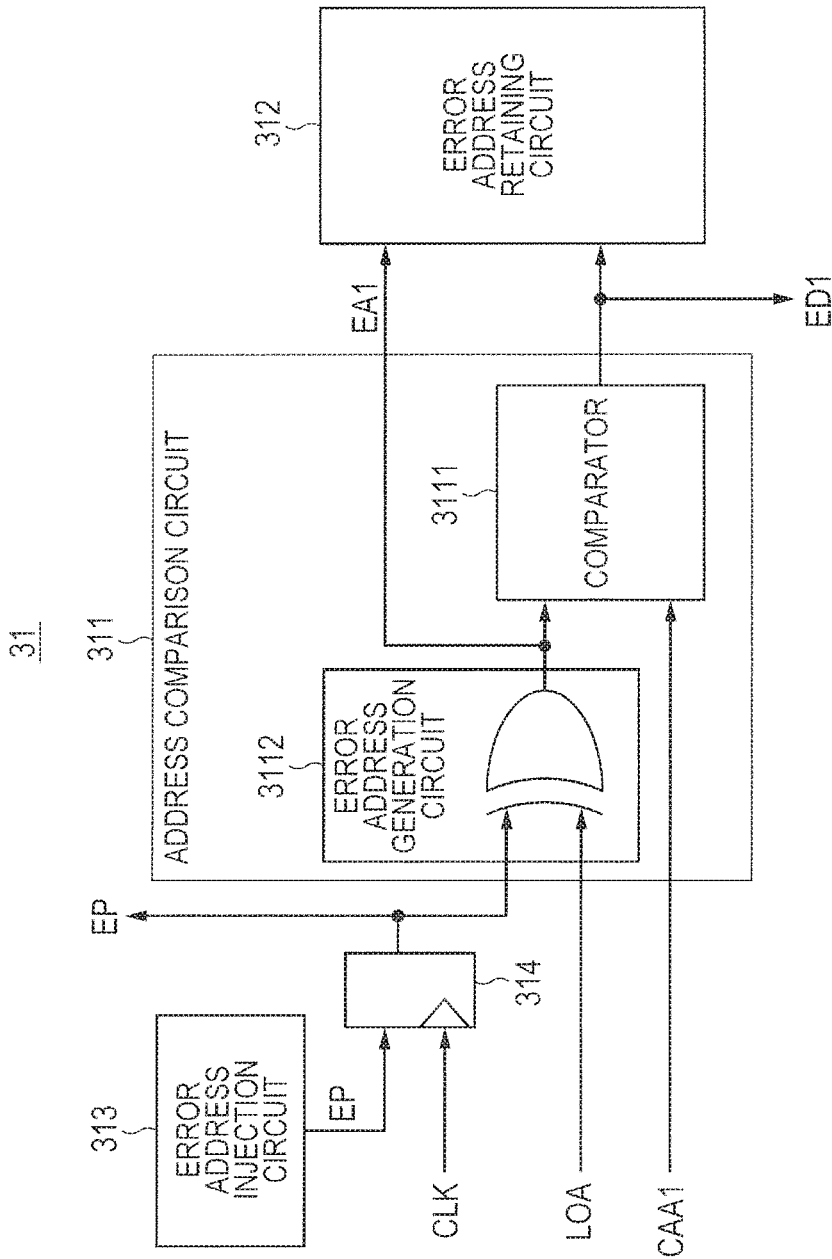
FIG. 5 is a block diagram illustrating a configuration example of one address fault detection circuit in FIG. 4.
Figure 6:
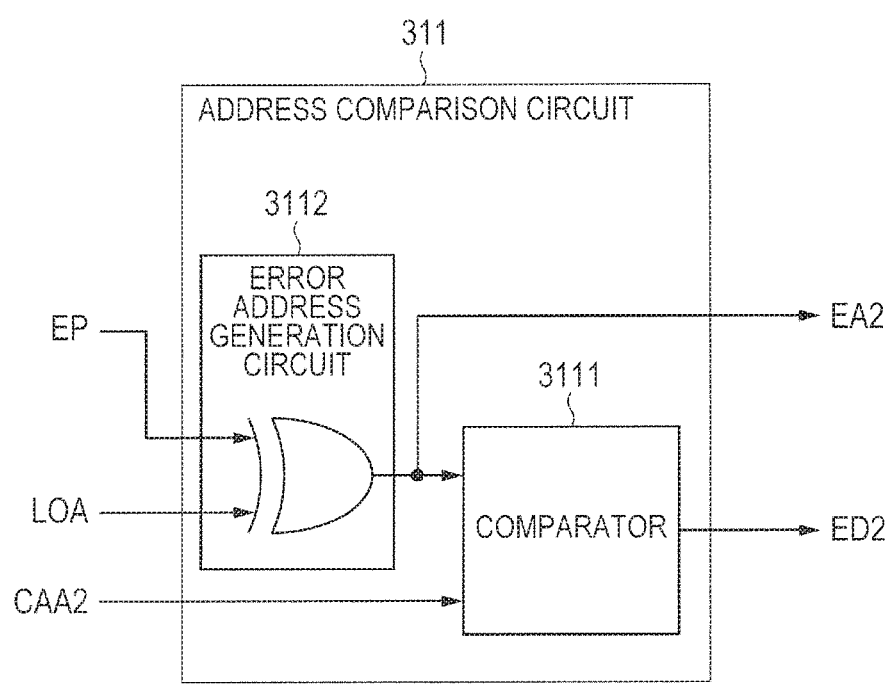
FIG. 6 is a block diagram illustrating a configuration example of another address fault detection circuit in FIG. 4.

FIGS. 4 through 6 are then used to describe configurations of the fault detection circuits. FIG. 4 is a block diagram illustrating a more detailed configuration of the CPU, the fault detection circuit, and the local memory in FIG. 2. FIG. 5 is a block diagram illustrating a configuration example of one address fault detection circuit in FIG. 4. FIG. 6 is a block diagram illustrating a configuration example of another address fault detection circuit in FIG. 4.

The CPU 11 includes an address generation circuit 13 and an address decoder 14 that generates an address signal (CAA1) for memory access and a memory selection signal (MS1) from an original address generated by the address generation circuit 13. The address decoder 14 decodes a high-order address of the original address (OA) to generate the memory selection signal (MS1) and outputs a low-order address of the original address (OA) as the address signal (CAA1) for memory access.

The address signal (CAA1) is transmitted to the duplexing comparison circuit 33, a selection circuit 37, and a synchronization circuit 38 through a signal line 111. The address signal (CAA1) is synchronized with a clock at the synchronization circuit 38 and is transmitted to the address fault detection circuit 31. The selection circuit 37 selects the address signal (CAA1) or a test address (TA) for memory BIST. The selected address is transmitted to the local memory 20 through a signal line 113. The memory selection signal (MS1) is transmitted to the local memory 20 and the duplexing comparison circuit 33 through a signal line 112.

The CPU 12 is configured similarly to the CPU 11. The address signal (CAA2) for memory access is transmitted to the duplexing comparison circuit 33 and a synchronization circuit 39 through a signal line 121. The address signal (CAA2) is synchronized with a clock at the synchronization circuit 39 and is transmitted to the address fault detection circuit 32. The memory selection signal (MS2) is transmitted to the duplexing comparison circuit 33 through a signal line 122. The duplexing comparison circuit 33 transmits an error signal (DE) to the error control circuit 36 when a signal from the side of the CPU 11 differs from a signal from the side of the CPU 12.

The local memory 20 includes a synchronization circuit 23 and a synchronization circuit 24. The synchronization circuit 23 synchronizes the address signal (CAA1) for memory access with the clock. The synchronization circuit 24 synchronizes the memory selection signal (MS1) with the clock. The local memory 20 further includes an address decoder 25, a control circuit 26, a word line driver 27, an IO 28, and a memory cell array 29. The address decoder 25 decodes an address signal synchronized at the synchronization circuit 23. The control circuit 26 is supplied with a memory selection signal synchronized at the synchronization circuit 24. The word line driver 27 is supplied with a row address. The IO 28 inputs or outputs data from a column selected by a column address. The local memory 20 moreover includes a path 211 that outputs an address signal for memory access synchronized at the synchronization circuit 23 as a memory output address signal (LOA). The memory output address signal (LOA) from the path 211 is transmitted to the address fault detection circuits 31 and 32 through a signal line 212.

As illustrated in FIG. 5, the address fault detection circuit 31 includes an address comparison circuit 311, an error address retaining circuit 312, an error address injection circuit 313, and a synchronization circuit 314. The address comparison circuit 311 includes a comparator 3111 and an error address generation circuit 3112. The comparator 3111 compares the address signal (CAA1) input to the local memory 20 with the memory output address signal (LOA) output from the local memory 20 and outputs an error detection signal (ED1) if the compared address signals mismatch. The error address generation circuit 3112 outputs the memory output address signal as an error address signal (EA1). The error detection signal (ED1) is transmitted to the error control circuit 36.

The error address retaining circuit 312 uses the error detection signal (ED1) to retain the error address signal (EA1). The error address retaining circuit 312 retains only the first generated error address signal. This is because an address fault requires prompt transition to the safe state. For example, the CPU 11 can read the error address signal (EA1) retained by the error address retaining circuit 312.

The error address injection circuit 313 injects a predetermined pattern into the error address generation circuit 3112. The error address generation circuit 3112 generates a quasi-error address based on the injected pattern by using a circuit (EOR circuit) that inverts one or more bits in a memory output address (LOA). This can test the comparator 3111. The error address injection circuit 313 injects a predetermined pattern also into the error address generation circuit 3112 of the address comparison circuit 311 of the address fault detection circuit 32 to be described later.

As illustrated in FIG. 6, the address fault detection circuit 32 includes the address comparison circuit 311 but does not include the error address retaining circuit 312, the error address injection circuit 313, and the synchronization circuit 314.

The error control circuit 36 detects the error detection signal (ED1 or DE) and outputs an interrupt request signal (IR), a reset request signal (RR), or a terminal output signal (TO) based on settings. The bus master such as the CPU or the system can thereby detect an error occurrence.

The description below explains operations of the entire circuit in FIG. 4.

The original address signal (OA) generated from the address generation circuit 13 in the master-side CPU 11 is input to the address decoder 14 and is decoded into the memory selection signal (MS1) and the address signal (CAA1) for memory access. Before input to the local memory 20, the memory selection signal (MS1) and the address signal (CAA1) are input to the duplexing comparison circuit 33 and are compared to the memory selection signal (MS2) and the address signal (CAA2) from the checker-side CPU 12, respectively.

The address signal (CAA1) branches to an input to the duplexing comparison circuit 33 and then passes through a selection circuit (multiplexer) 37 to select a test address signal (TA) for memory BIST. During the runtime (user mode), the selection circuit (multiplexer) 37 always selects the address signal (CAA1) output from the bus master.

The address signal along the signal line 113 is subject to retiming in the synchronization circuit 23 configured by a flip-flop in the local memory 20, branches prior to the address decoder 25, and is output from the local memory 20. At this time, a read/write (R/W) access to the local memory 20 is performed as usual while the asserted memory selection signal (MS1) and the address signal allow the memory decoder 25 to select an address space for the memory cell array 29. The memory output address signal (LOA) is input to the address fault detection circuit 31. The comparator 3111 of the address fault detection circuit 31 compares the address signal (CAA1) with the memory output address signal (LOA). When the comparator 3111 detects an address signal mismatch, the address comparison circuit 311 outputs the memory output address signal (LOA) as an error address (EA1) and the error address retaining circuit 312 retains the error address (EA1). At this time, the address comparison circuit 311 inputs the error detection signal (ED1) to the error control circuit 36.

The memory output address signal (LOA) is input to the address fault detection circuit 32. The comparator 3111 of the address fault detection circuit 32 compares the address signal (CAA2) with the memory output address signal (LOA). When the comparator 3111 detects an address signal mismatch, the address fault detection circuit 32 outputs the memory output address signal (LOA) as an error address (EA2) and outputs an error detection signal (ED2).

When a user predetermines a process for each error, the error control circuit 36 outputs the reset request signal (RR), the interrupt request signal (IR), and the terminal output signal (TO). The system detects an error occurrence based on these signals output from the error control circuit 36. Subsequently accessing the error control circuit 36 and the error address retaining circuit 312 can specify an error cause and a destination address of incorrect writing or reading.

The error address injection circuit 313 is used to diagnose a fault for the comparator 3111 of the address comparison circuit 311. Setting the error address injection circuit 313 inverts some bits of the memory output address signal (LOA) and allows the comparator 3111 to perform comparison with the address signal (CAA1). When the comparator 3111 is not faulty, there obviously occurs a mismatch between a signal output from the error address generation circuit 3112 and the address signal (CAA1), making it possible to test a fault for the comparator 3111.

With reference to FIGS. 4 and 5, there has been described the case where the CPU 10 as the memory access circuit accesses the local memory 20. The same applies to a case where the CPU 40 as the memory access circuit accesses the shared memory 50.

Comparison between an address input to the memory from the memory access circuit and an address output from the memory makes it possible to detect address faults on the memory subsequent to the lockstep. Retaining an address output from the memory as an error address makes it possible to detect a destination address for incorrect writing and specify data destroyed by incorrect writing.

Modifications

Typical modifications will be described below. The following description of the modifications assumes that the same reference symbols as used for the above-mentioned working example are used for the parts including the configuration and the function similar to those explained in the above-mentioned working example. The description of the above-mentioned working example is applicable to the description of those parts as needed within a technologically undeviating scope. Parts of the above-mentioned working example and all or part of the modifications are interchangeably applicable as needed within a technologically undeviating scope.

First Modification

Figure 7:
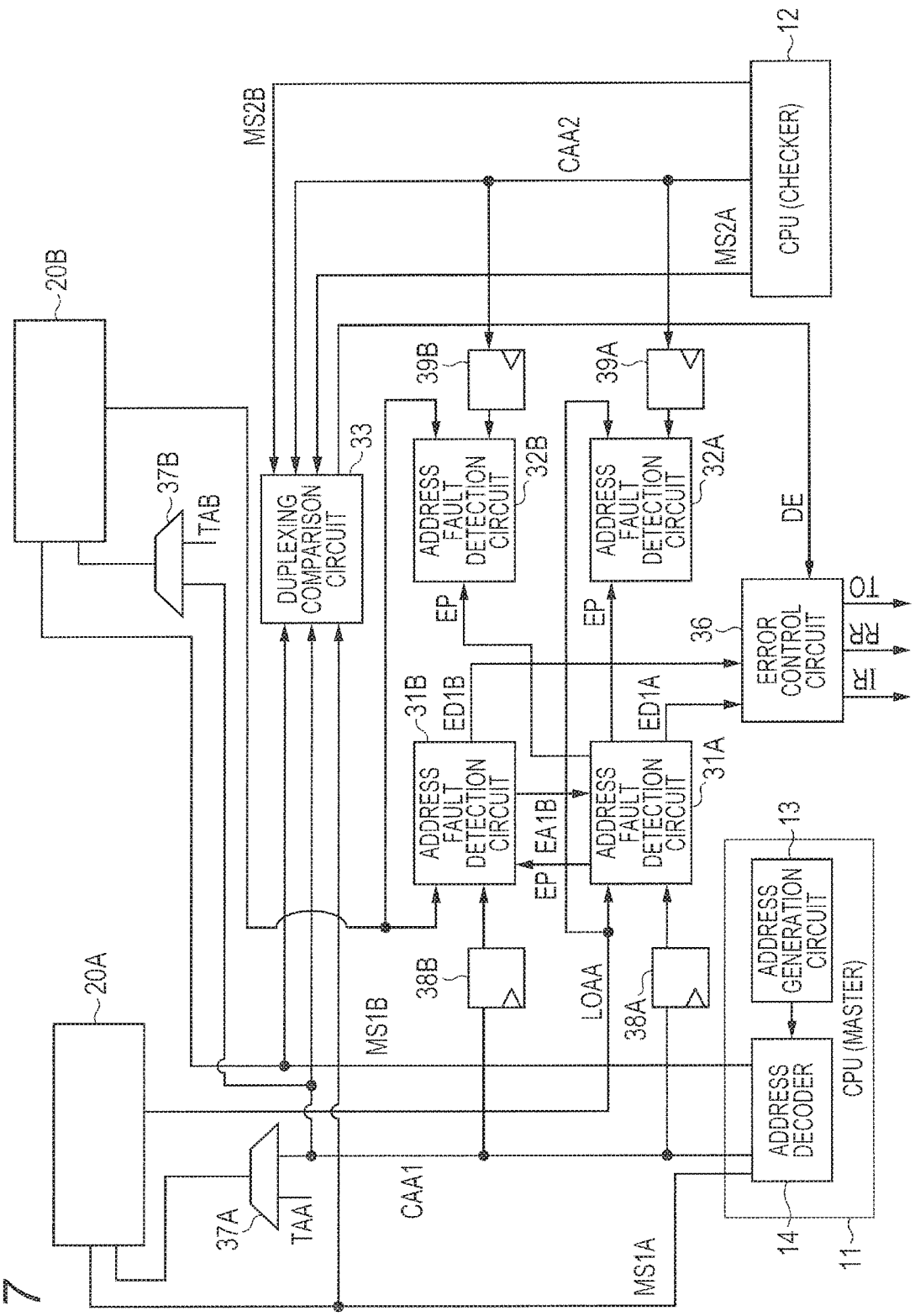
FIG. 7 is a block diagram illustrating another configuration example of the CPU, the fault detection circuit, and the local memory in FIG. 2.
Figure 8:
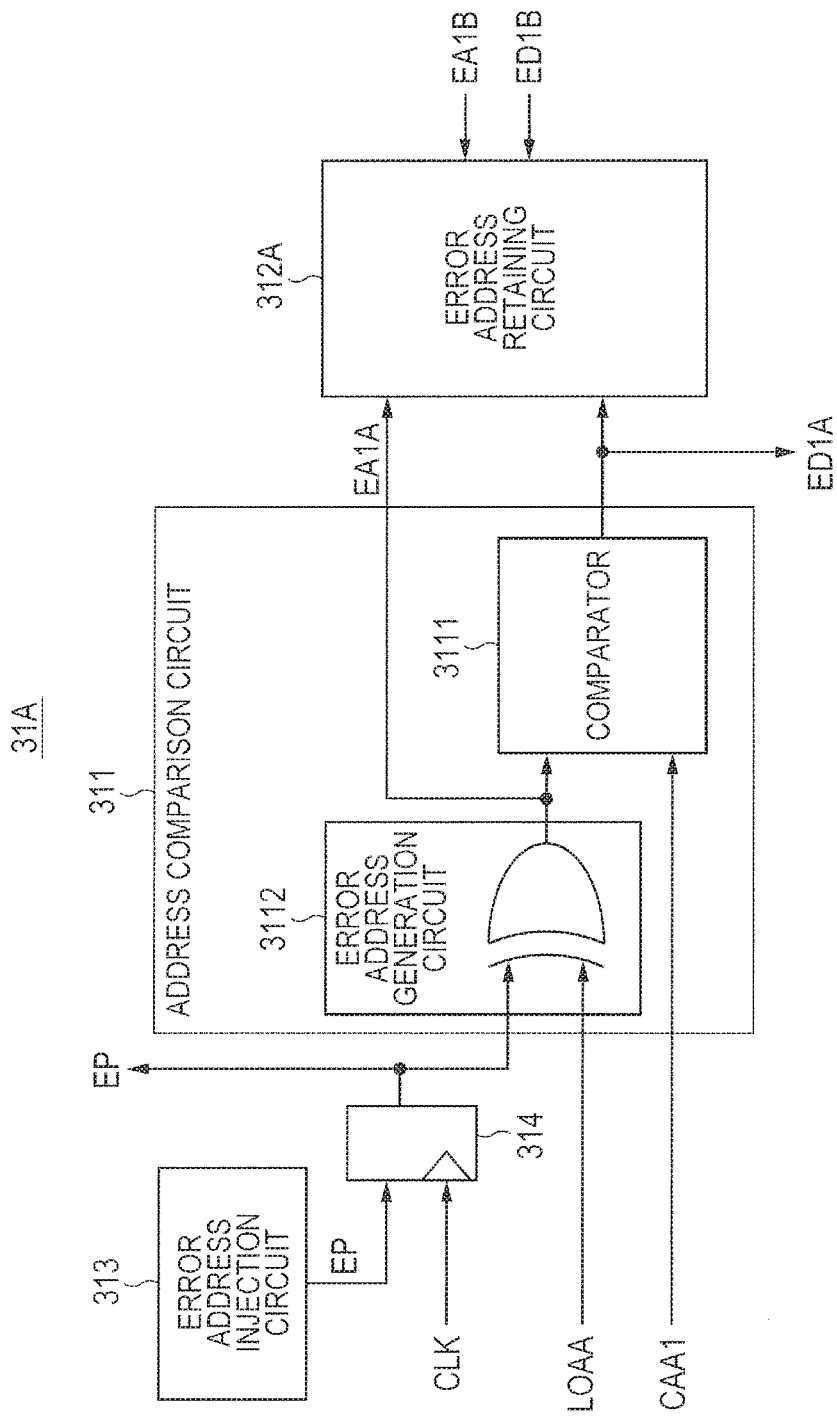
FIG. 8 is a block diagram illustrating a configuration example of the address fault detection circuit in FIG. 7.

With reference to FIGS. 7 and 8, the description below explains a case where there is a plurality of the local memories 20 (for example, two local memories such as local memory 20A and local memory 20B). FIG. 7 is a block diagram illustrating another configuration example of the CPU, the fault detection circuit, and the local memory in FIG. 2. FIG. 8 is a block diagram illustrating a configuration example of the address fault detection circuit in FIG. 7.

The CPU 11 includes the address generation circuit 13 and the address decoder 14 that generates an address signal (CAA1) for memory access and memory selection signals (MS1A and MS1B) from an original address generated by the address generation circuit 13. The address decoder 14 decodes a high-order address of the original address (OA) to generate the memory selection signals (MS1A and MS1B) and outputs a low-order address of the original address (OA) as the address signal (CAA1) for memory access.

The address signal (CAA1) is transmitted to the duplexing comparison circuit 33, selection circuits 37A and 37B, and synchronization circuits 38A and 38B. The address signal (CAA1) is synchronized with the clock at the synchronization circuits 38A and 38B and is transmitted to address fault detection circuits 31A and 31B. The selection circuits 37A and 37B select the address signal (CAA1) or test addresses (TAA and TAB) for memory BIST. The selected addresses are transmitted to the local memories 20A and 20B. The memory selection signal (MS1B) is transmitted to the local memory 20B and the duplexing comparison circuit 33. The memory selection signal (MS1A) is transmitted to the local memory 20A and the duplexing comparison circuit 33.

The CPU 12 is configured similarly to the CPU 11. The address signal (CAA2) for memory access is transmitted to address fault detection circuits 32A and 32B, the duplexing comparison circuit 33, and synchronization circuits 39A and 39B. Memory selection signals (MS2A and MS2B) are transmitted to the duplexing comparison circuit 33.

The local memories 20A and 20B are configured similarly to the local memory 20. The local memory 20A outputs the address signal for memory access synchronized with the clock at the synchronization circuit 23 as a memory output address signal (LOAA). The local memory 20B outputs the address signal for memory access synchronized with the clock at the synchronization circuit 23 as a memory output address signal (LOAB). The memory output address signal (LOAA) is transmitted to the address fault detection circuits 31A and 32A. The memory output address signal (LOAB) is transmitted to the address fault detection circuits 31B and 32B.

As illustrated in FIG. 8, the address fault detection circuit 31A includes the address comparison circuit 311, an error address retaining circuit 312A, the error address injection circuit 313, and the synchronization circuit 314. The address comparison circuit 311 includes the comparator 3111 and the error address generation circuit 3112. The comparator 3111 compares the address signal (CAA1) input to the local memory 20 with the memory output address signal (LOAA) output from the local memory 20A and outputs an error detection signal (ED1A) if the compared address signals mismatch. The error address generation circuit 3112 outputs the memory output address signal as an error address signal (EA1A). The error detection signal (ED1A) is transmitted to the error control circuit 36.

The error address retaining circuit 312A uses the error detection signal (ED1A) to retain the error address signal (EA1A) and uses the error detection signal (ED1B) to retain the error address signal (EA1B). The error address retaining circuit 312A retains only the first generated error address signal. This is because an address fault requires prompt transition to the safe state. For example, the CPU 11 can read the error address signal (EA1A) or the error address signal (EA1B) retained by the error address retaining circuit 312.

The error address injection circuit 313 injects a predetermined pattern into the error address generation circuit 3112. The error address generation circuit 3112 generates a quasi-error address based on the injected pattern by using the circuit (EOR circuit) that inverts one or more bits in a memory output address (LOAA). This can test the comparator 3111. The error address injection circuit 313 injects a predetermined pattern also into the error address generation circuit 3112 of the address comparison circuit 311 of the address fault detection circuit 32 to be described later.

Similarly to the address fault detection circuit 32 according to the working example (FIG. 6), the address fault detection circuits 31B, 32A, and 32B include the address comparison circuit 311 but do not include the error address retaining circuit 312, the error address injection circuit 313, and the synchronization circuit 314. The error detection signal (ED1B) and the error address signal (EA1B) are transmitted to the error address retaining circuit 312A of the address fault detection circuit 31A.

The error detection signal (ED1B) is transmitted to the error control circuit 36.

The error control circuit 36 detects the error detection signal (ED1A, ED1B, or DE) and outputs the interrupt request signal (IR), the reset request signal (RR), or the terminal output signal (TO) based on settings. The bus master such as the CPU or the system can thereby detect an error occurrence.

The address signal (CAA2) for memory access is transmitted to the duplexing comparison circuit 33 and the synchronization circuits 39A and 39B. The address signal (CAA2) is synchronized with the clock at the synchronization circuits 39A and 39B and is transmitted to the address fault detection circuits 32A and 32B. The memory selection signals (MS2A and MS2B) are transmitted to the duplexing comparison circuit 33. The duplexing comparison circuit 33 transmits the error signal (DE) to the error control circuit 36 when a signal from the side of the CPU 11 differs from a signal from the side of the CPU 12.

The address decoder 14 in the CPU 11 decodes an original address (OA) generated by the address generation circuit 13 and generates the memory selection signals (MS1A and MS1B) and an access address (CAA1) for the local memories 20A and 20B. The memory selection signal (MS1A or MS1B) selects an access to the local memory 20A or 20B and enables an access to the local memory 20A or the local memory 20B. The comparator 3111 of the address fault detection circuit 31A or 31B then compares a memory output address (LOAA or LOAB) output from the local memory selected and accessed by the CPU 11 with the access address (CAA1) input to the local memory 20A or 20B from the CPU 11. When a comparison result from the comparator 3111 shows a mismatch, the error address retaining circuit 312 retains the error address (EA1A or EA1B) and the error control circuit 36 is notified of the error detection signal (ED1A or ED1B) similarly to the working example.

Setting the error address injection circuit 313 can inject a fault into both of the memory output addresses (LOAA and LOAB). The error address injection circuit injects a fault depending on the memory as an access destination to test the comparator 3111 of the address fault detection circuit 31A or 31B.

With reference to FIGS. 7 and 8, there has been described the case where the CPU 10 as the memory access circuit accesses the local memory 20. The same applies to a case where the CPU 40 as the memory access circuit accesses the shared memory 50.

It is possible to prevent an area from increasing by allowing each memory to share the duplexing comparison circuit, the error address injection circuit, the error address retaining circuit, or the error control circuit. No need to settle a common circuit for each memory contributes to reducing the software processing time. Moreover, the error address injection circuit can be assigned to address signals output from the memory in common. The test can be performed along the memory space without understanding a physical memory configuration.

Second Modification

Figure 9:
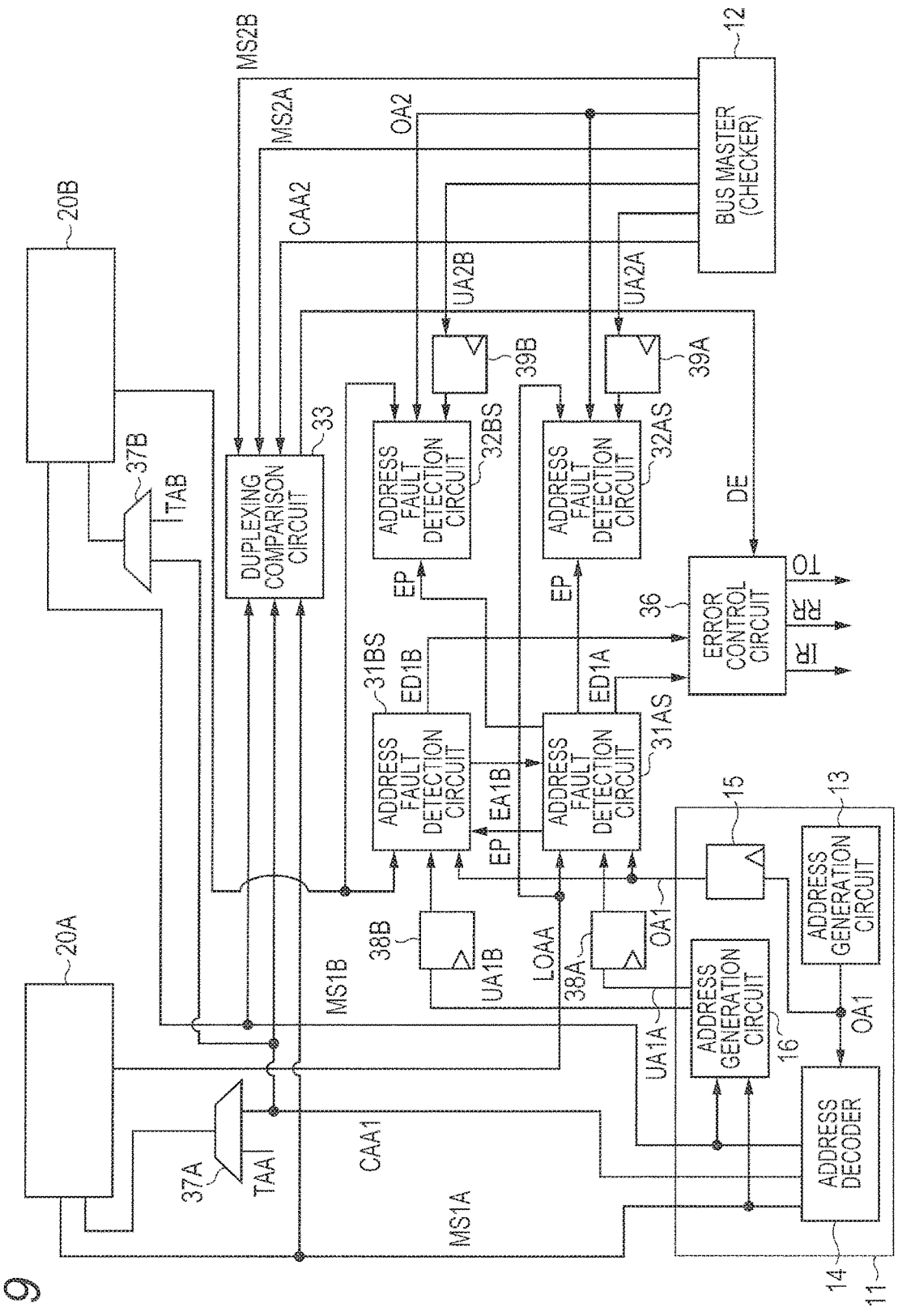
FIG. 9 is a block diagram illustrating another configuration example of the CPU, the fault detection circuit, and the local memory in FIG. 2.
Figure 10:
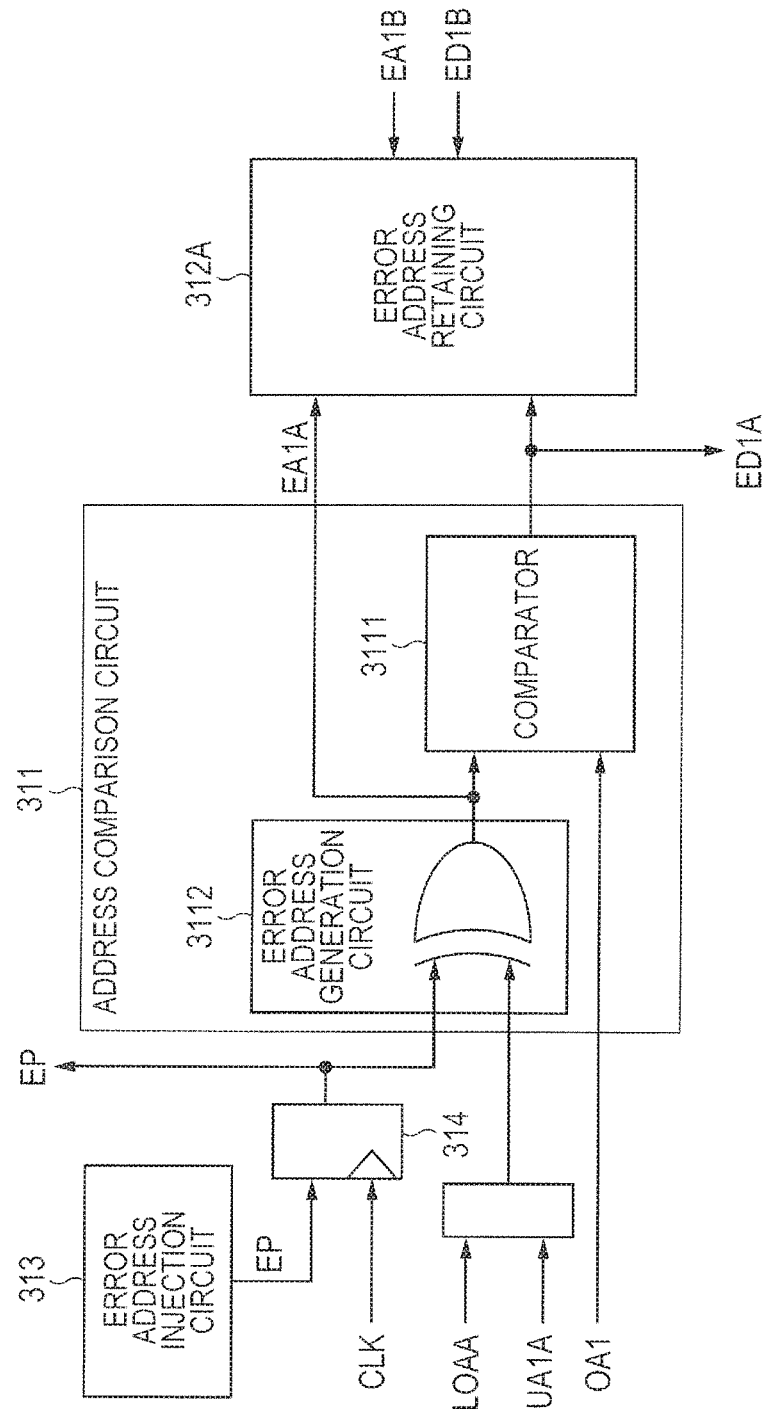
FIG. 10 is a block diagram illustrating a configuration example of the address fault detection circuit in FIG. 9.

With reference to FIGS. 9 and 10, the description below explains an example of performing fault detection on a circuit in the memory access circuit. FIG. 9 is a block diagram illustrating another configuration example of the CPU, the fault detection circuit, and the local memory in FIG. 2. FIG. 10 is a block diagram illustrating a configuration example of the address fault detection circuit in FIG. 9.

The CPU 11 includes the address generation circuit 13, the address decoder 14, a synchronization circuit 15, and an address generation circuit 16. The address decoder 14 generates an address signal (CAA1) for memory access and memory selection signals (MS1A and MS1B) from an original address generated by the address generation circuit 13. The address decoder 14 decodes a high-order address of the original address (OA) to generate the memory selection signals (MS1A and MS1B) and outputs a low-order address of the original address (OA1) as the address signal (CAA1) for memory access. The synchronization circuit 15 outputs the original address (OA1) synchronized with the clock. The original address (OA1) is transmitted to address fault detection circuits 31AS and 31BS. The address generation circuit 16 generates address signals (UA1A and UA1B) corresponding to the high-order side of the original address (OA) from the memory selection signals (MS1A and MS1B). The address signal (UA1A) is synchronized with the clock at the synchronization circuit 38A and is transmitted to the address fault detection circuit 31AS. The address signal (UA1B) is synchronized with the clock at the synchronization circuit 38B and is transmitted to the address fault detection circuit 31BS.

The address signal (CAA1) is transmitted to the duplexing comparison circuit 33 and the selection circuits 37A and 37B. The selection circuits 37A and 37B select the address signal (CAA1) or test addresses (TAA and TAB) for memory BIST. The selected addresses are transmitted to the local memories 20A and 20B. The memory selection signal (MS1B) is transmitted to the local memory 20B and the duplexing comparison circuit 33. The memory selection signal (MS1A) is transmitted to the local memory 20A and the duplexing comparison circuit 33.

The CPU 12 is configured similarly to the CPU 11. The address signal (CAA2) for memory access is transmitted to the duplexing comparison circuit 33. The memory selection signals (MS2A and MS2B) are transmitted to the duplexing comparison circuit 33.

The local memories 20A and 20B are configured similarly to the local memory 20. The local memory 20A outputs the address signal for memory access synchronized at the synchronization circuit 23 as the memory output address signal (LOAA). The local memory 20B outputs the address signal for memory access synchronized at the synchronization circuit 23 as the memory output address signal (LOAB). The memory output address signal (LOAA) is transmitted to the address fault detection circuits 31AS and 32AS. The memory output address signal (LOAB) is transmitted to the address fault detection circuits 31BS and 32BS.

As illustrated in FIG. 10, the address fault detection circuit 31AS includes the address comparison circuit 311, the error address retaining circuit 312A, the error address injection circuit 313, the synchronization circuit 314, and a coupling circuit 315. The address comparison circuit 311 includes the comparator 3111 and the error address generation circuit 3112. The comparator 3111 compares the original address signal (OA1) input to the local memory 20 with an address resulting from coupling the memory output address signal (LOAA) with the high-order address signal (UA1A). The error detection signal (ED1A) is output if the compared address signals mismatch. The error address generation circuit 3112 outputs a memory output address signal as the error address signal (EA1A). The error detection signal (ED1A) is transmitted to the error control circuit 36.

The error address retaining circuit 312A equals the first modification. The error address injection circuit 313 equals the first modification.

The address fault detection circuits 31BS, 32AS, and 32BS include the address comparison circuit 311 and the coupling circuit 315 but do not include the error address retaining circuit 312A, the error address injection circuit 313, and the synchronization circuit 314. The error detection signal (ED1B) or the error address signal (EA1B) is transmitted to the error address retaining circuit 312 of the address fault detection circuit 31A. The error address retaining circuit 312 retains only the first generated error address signal. This is because an address fault requires prompt transition to the safe state. For example, the CPU 11 can read the error address signal (EA1A) or the error address signal (EA1B) retained by the error address retaining circuit 312.

The error detection signal (ED1B) is transmitted to the error control circuit 36.

The error control circuit 36 detects the error detection signal (ED1A, ED1B, or DE) and outputs the interrupt request signal (IR), the reset request signal (RR), or the terminal output signal (TO) based on settings. The bus master such as the CPU or the system can thereby detect an error occurrence.

The CPU 12 is configured similarly to the CPU 11. The address generation circuit 16 generates address signals (UA2A and UA2B) corresponding to the high-order side of the original address (OA) from the memory selection signals (MS2A and MS2B). The address signal (UA2A) is synchronized with the clock at the synchronization circuit 39A and is transmitted to the address fault detection circuit 32A. The address signal (UA2B) is synchronized with the clock at the synchronization circuit 39B and is transmitted to the address fault detection circuit 32B. The address signal (CAA2) for memory access is transmitted to the duplexing comparison circuit 33. The memory selection signals (MS2A and MS2B) are transmitted to the duplexing comparison circuit 33. The duplexing comparison circuit 33 transmits the error signal (DE) to the error control circuit 36 when a signal from the side of the CPU 11 differs from a signal from the side of the CPU 12.

The address generation circuit 16 in the CPU 11 encodes the memory selection signal (MS1A or MS1B) output from the address decoder 14 to again generate a high-order address signal (UA1A or US1B). The comparator 311*l* of the address fault detection circuit 31A or 31B compares the original address signal (OA) output from the address generation circuit 13 with an address signal resulting from coupling the high-order address signal (UA1A or US1B) generated by the address generation circuit 16 with the low-order address signal (memory output signal LOAA or LOAB)) output from the local memory 20A or 20B. It is thereby possible to detect a fault of the address decoder 14.

With reference to FIGS. 9 and 10, there has been described the case where the CPU 10 as the memory access circuit accesses the local memory 20. The same applies to a case where the CPU 40 as the memory access circuit accesses the shared memory 50.

According to the working example and the first modification, the address fault detection circuit cannot detect a fault on the address line or the address decoder in the memory access circuit. According to the second modification, an address before input to the address decoder in the memory access circuit is output outside the bus master and is compared with an address output from the memory in the address fault detection circuit. It is thereby possible to detect a fault on the address decoder in the memory access circuit of a product that includes the memory access circuit unrelated to the lockstep configuration.

While there has been described the embodiment, the working example, and the modifications of the present invention created by the inventors, it is to be distinctly understood that the present invention is not limited to the embodiment, the working example, and the modifications, but may be otherwise variously modified.

For example, the working example and the modifications have described the case where the memory access circuit accesses the memory, but not limited thereto. The above is also applicable to a case where the memory access circuit accesses the shared resource such as a circuit including a register.

The working example and the modifications have described detection of a fault on an address path by comparing addresses to access the memory, but not limited thereto. For example, memory selection signals may be compared.

The working example and the modifications have described the case of using one set of the master-side CPU and the checker-side CPU and one set of the local memory and the fault detection circuit, but not limited thereto. Two or more sets may be applicable.

What is claimed is:

1. A semiconductor device comprising:
   a first memory access circuit;
   a first memory that outputs a first memory address based on a first access address input from the first memory access circuit;
   a second memory that outputs a second memory address based on a first access address input from the first memory access circuit;
   a first address comparison circuit that compares the first access address with the first memory address;
   a second address comparison circuit that compares the first access address with the second memory address;
   a second memory access circuit to check the first memory access circuit;
   a duplexing comparison circuit that compares a first access address output from the first memory access circuit with a second access address output from the second memory access circuit, compares a first memory selection signal output from the first memory access circuit with a third memory selection signal output from the second memory access circuit, and compares a second memory selection signal output from the first memory access circuit with a fourth memory selection signal output from the second memory access circuit; and
   an error control circuit that outputs a control signal based on a comparison result from the first address comparison circuit, a comparison result from the second comparison circuit, and a comparison result from the duplexing comparison circuit.

2. The semiconductor device according to claim 1, wherein the first address comparison circuit includes:
   an error injection circuit that generates a pattern to generate an error address;
   a first error address generation circuit that generates a first error address based on the first memory address and an output from the error injection circuit;
   a first comparison circuit that compares the first access address with a first address output from the first error address generation circuit; and
   an error address retaining circuit that retains the first address based on a comparison result from the first comparison circuit,
   wherein the second address comparison circuit includes:
   a second error address generation circuit that generates a second error address based on the second memory address and an output from the error injection circuit; and
   a second comparison circuit that compares the first access address with a second address output from the second error address generation circuit,
   wherein the first address corresponds to one of the first error address and the first access address,
   wherein the second address corresponds to one of the second error address and the first access address, and
   wherein the error address retaining circuit retains the second address based on a comparison result from the second comparison circuit.

3. The semiconductor device according to claim 2, further comprising:
   a third address comparison circuit that compares the second access address and the first memory address; and a fourth address comparison circuit that compares the second access address and the second memory address,
wherein a third address comparison circuit includes:
  a third error address generation circuit that generates a third error address based on the first memory address an output from the error injection circuit; and
  a third comparison circuit that compares the second access address with a third address output from the third error address generation circuit,
wherein a fourth address comparison circuit includes:
  a fourth error address generation circuit that generates a fourth error address based on the second memory address and an output from the error injection circuit; and
  a fourth comparison circuit that compares the second access address with a fourth address output from the fourth error address generation circuit,
wherein the third address corresponds to one of the third error address and the second access address, and
wherein the fourth address corresponds to one of the fourth error address and the second access address.

4. The semiconductor device according to claim 1, wherein the first memory access circuit and the second memory access circuit correspond to a CPU.

5. The semiconductor device according to claim 1, wherein the first memory access circuit and the second memory access circuit correspond to a memory controller.

6. A semiconductor device comprising:
  a first memory access circuit including a first address generation circuit, a first address decoder to generate a first access address, a first memory selection signal, and a second memory selection signal from a first original address generated by the first address generation circuit, and a second address generation circuit to generate a high-order address of the first access address from the first memory selection signal and the second memory selection signal;
  a first memory that generates a first memory address based on the first access address;
  a second memory that generates a second memory address based on the first access address;
  a first address comparison circuit that compares the first original address with a first restoration address resulting from combining the first memory address with a high-order address of the first access address;
  a second address comparison circuit that compares the first original address with a second restoration address resulting from combining the second memory address with a high-order address of the first access address; and
  an error control circuit that outputs a control signal based on one of a comparison result from the first address comparison circuit and a comparison result from the second address comparison circuit.

7. The semiconductor device according to claim 6, wherein the first address comparison circuit includes:
  an error injection circuit that generates a pattern to generate an error address;
  a first error address generation circuit that generates a first error address based on the first memory address and an output from the error injection circuit;
  a first comparison circuit that compares the first restoration address with a first address output from the first error address generation circuit; and
  an error address retaining circuit that retains the first address based on a comparison result from the first comparison circuit, wherein the second address comparison circuit includes:
  a second error address generation circuit that generates a second error address based on the second memory address and an output from the error injection circuit; and
  a second comparison circuit that compares the second restoration address with a second address output from the second error address generation circuit,
wherein the first address corresponds to one of the first error address and the first access address,
wherein the second address corresponds to one of the second error address and the first access address, and
wherein the error address retaining circuit retains the second address based on a comparison result from the second comparison circuit.

8. The semiconductor device according to claim 7, further comprising:
  a second memory access circuit including a third address generation circuit, a second address decoder to generate a second access address, a third memory selection signal, and a fourth memory selection signal from a second original address generated by the third address generation circuit, and a fourth address generation circuit to generate a high-order address of the second access address from the third memory selection signal and the fourth memory selection signal; and
  a duplexing comparison circuit that compares a first access address with a second access address, compares a first memory selection signal with a third selection signal, and compares a second memory selection signal with a fourth selection signal,
wherein the error control circuit outputs a control signal based on a comparison result from the duplexing comparison circuit.

9. The semiconductor device according to claim 8, further comprising:
  a third address comparison circuit that compares the second original address with a third restoration address resulting from combining the first memory address with a high-order address of the second access address; and
  a fourth address comparison circuit that compares the second original address with a fourth restoration address resulting from combining the second memory address with a high-order address of the second access address,
wherein the third address comparison circuit includes:
  a third error address generation circuit that generates a third error address based on the first memory address and an output from the error injection circuit;
  a third comparison circuit that compares the third restoration address with a third address output from the third error address generation circuit,
wherein the fourth address comparison circuit includes:
  a fourth error address generation circuit that generates a fourth error address based on the second memory address and an output from the error injection circuit; and
  a fourth comparison circuit that compares the fourth restoration address with a fourth address output from the fourth error address generation circuit,
wherein the third address corresponds to one of the third error address and the second access address, and
wherein the fourth address corresponds to one of the fourth error address and the second access address.

10. The semiconductor device according to claim 8, wherein the first memory access circuit and the second memory access circuit correspond to a CPU.

11. The semiconductor device according to claim 8, wherein the first memory access circuit and the second memory access circuit correspond to a memory controller.

* * * * *